Jan. 3, 1928.
J. MUIR
1,655,156
METHOD OF MAKING EMANATION SEEDS
Filed Nov. 13, 1925
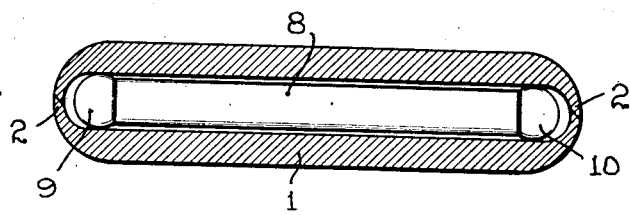
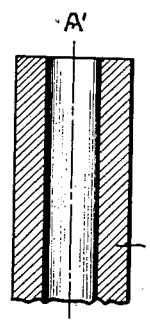
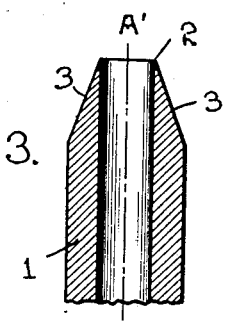
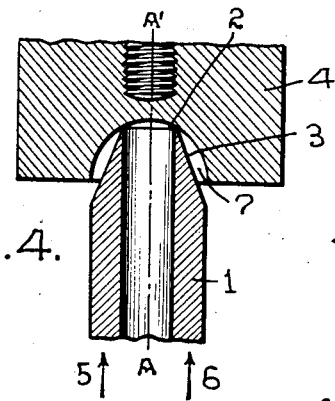
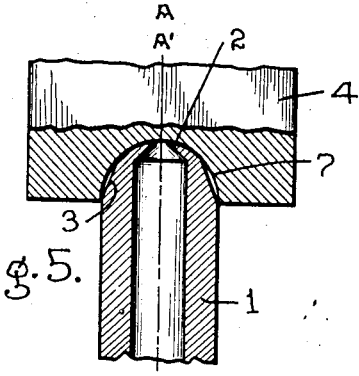
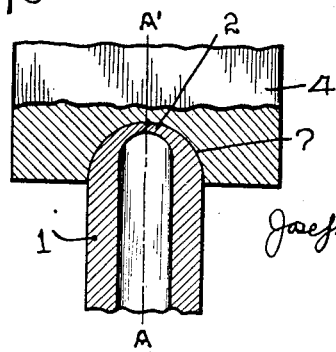
Joseph Muir,
Inventor
By Ivan P. Tashof,
Attorney Patented Jan. 3, 1928.

1,655,156

UNITED STATES PATENT OFFICE.

JOSEPH MUIR, OF NEW YORK, N. Y., ASSIGNOR TO THE RADIUM EMANATION CORPORATION.

METHOD OF MAKING EMANATION SEEDS.

Application filed November 13, 1925. Serial No. 68,912.

My invention relates to the production of radium emanation seeds or tubes. Specifically, my invention relates to the production of metal seeds or tubes which are adapted to be implanted in biological tissue.

Radium emanation tubes or seeds have present therein radium emanation. These seeds may be composed of glass or metal which will absorb certain of the emanation rays. For example, the material of the metal seed may be platinum, gold or silver or alloys thereof.

The metal seed may have radium emanation introduced directly thereunto or be of a composite type wherein the emanation is first introduced in a glass tube and the latter is enclosed in a metal container.

In order that my invention may be clearly understood I shall refer to the drawing in which—

Figure 1 is a longitudinal section of a composite seed comprising a glass tube encased in a metal tube;

Figure 2 is a longitudinal cross section of the metal tube, in its initial state;

Figure 3 is a longitudinal section of the tube with one of its ends reduced to a conical shape;

Figure 4 is a longitudinal section of the tube placed against a hemispherical die for the purpose of having its end upset;

Figure 5 is a longitudinal section of the tube and die, the end of the tube being partially upset; and, Figure 6 is a longitudinal section of the tube and die, with the end of the tube completely closed after the final upsetting step.

The first step in producing the finished tube 1 as shown in Figure 1 is to place the tube in a lathe and allow it to rotate around the axis A—A'. While the tube is rotating the end 2 is cut or filed to a conical surface as indicated at 3 in Figure 3. While the tube is rotating it is brought to bear against a hemispherical die 4, or the die 4 may be rotated and the tube held stationary. Upon applying pressure at 5 and 6 as shown in Figure 4, the conical surface 3 will tend to take the shape of the hemispherical cup 7 of the die 4. The end of the tube upsets or bends to a position as indicated in Figure 5. On the continued application of pressure the end 2 of the tube 1 is closed taking the shape of the hemispherical cup.

After one end of the tube is formed, the glass seed 8 is placed inside of the tube 1 and the open end of the tube is closed in a similar manner producing the finished seed as indicated in Figure 1.

Referring to Figures 1 and 6 it will be seen that the finished metal tube 1 is of less thickness at its end than at its intermediate portion. Since the metal tube 1 is usually used in connection with a glass tube 8 having at its end glass balls 9 and 10, it is seen that I have provided a metal tube of reduced thickness at its ends which is still capable of taking care of the absorption of the beta rays radiating from the radium emanation, the glass balls 9 and 10 providing an additional glass filterage.

The composite seed herein set forth and the process of burying the same in tissue are claimed in applicant's copending applications, Serial No. 68,910 and No. 68,911, filed November 13, 1925.

I claim:

1. The process of making a composite radium emanation seed consisting of a glass tube containing radium emanation provided with balls at its ends enclosed in a metal tube having less metal at its ends than at its intermediate portion, comprising removing a portion of the metal on one of the ends of the metal tube, upsetting and closing said end, inserting a glass tube into the partially closed metal tube, and thereafter removing the metal from the open end of the metal tube and upsetting said latter open end to provide a closed metal tube having less metal at its ends than at its intermediate portion, capable of absorbing the undesirable rays radiating from the radium emanation.

2. The process of making a composite radium emanation seed consisting of a glass tube containing radium emanation provided with balls at its ends enclosed in a metal tube having less metal at its ends than at its intermediate portion, comprising reducing one end of the metal tube to a conical surface, upsetting and closing said conical surface, inserting a glass tube in the partially closed metal tube and thereafter reducing the open end of the metal tube to a conical surface, and upsetting said latter conical surface to provide a closed metal tube having less metal at its ends than at its intermediate portion, capable of absorbing undesirable rays radiating from the radium emanation.

3. The process of making a composite radium emanation seed consisting of a glass tube containing radium emanation provided with balls at its ends enclosed in a metal tube having less metal at its ends than at its intermediate portion, comprising reducing one end of the metal tube to a conical surface, subjecting said conical surface to the preliminary action of a rotating die whereby said conical surface is partially upset, continuing the action of the die to finally close said end of said tube, inserting a glass tube into the partially closed metal tube and thereafter reducing the open end of the metal tube to a conical surface, subjecting said latter conical surface to the preliminary action of a rotating die whereby said latter conical surface is partially upset and continuing the action of the die to provide a closed metal tube having less metal at its ends than at its intermediate portion, capable of absorbing the undesirable rays radiating from the radium emanation.

In testimony whereof I have subscribed my name hereto.

JOSEPH MUIR.